Sept. 2, 1958 H. G. TWIFORD 2,850,061
CENTER POST FOR TIRE CHANGER
Filed Feb. 25, 1955
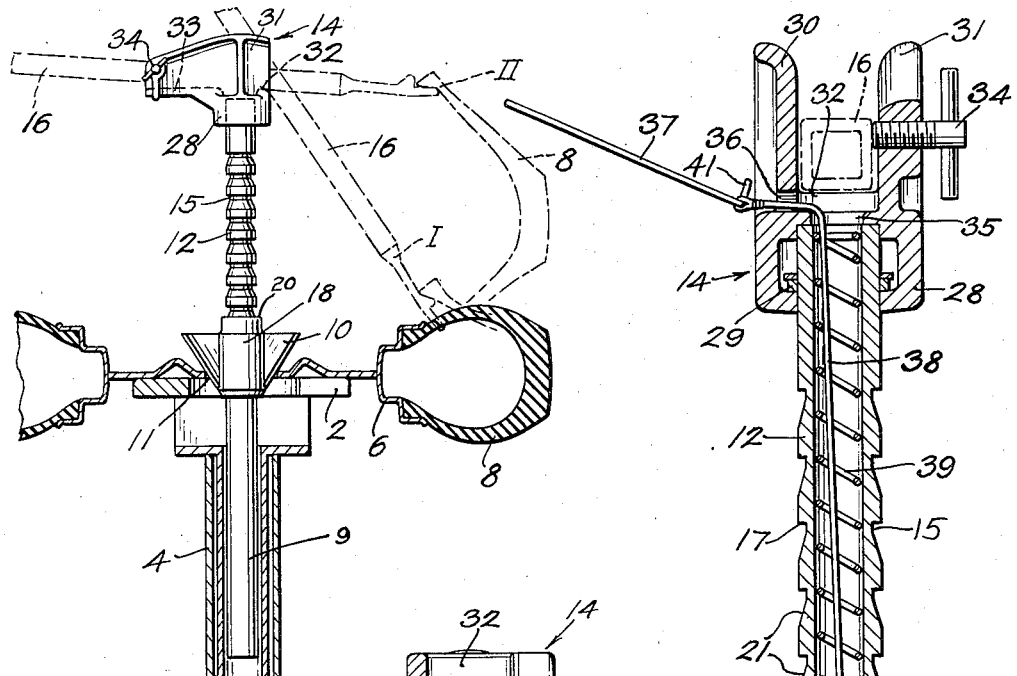
Fig. 1.
Fig. 3.
Fig. 4.
Fig. 2.
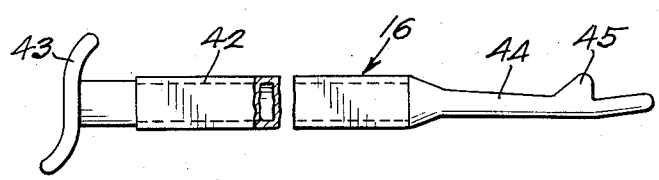
Fig. 5.
INVENTOR.
HARRY G. TWIFORD
BY
McGrew & Edwards
ATTORNEYS

United States Patent Office 2,850,061
Patented Sept. 2, 1958

2,850,061

CENTER POST FOR TIRE CHANGER

Harry G. Twiford, Denver, Colo.

Application February 25, 1955, Serial No. 490,564

5 Claims. (Cl. 144—288)

This invention relates to tire mounting and dismounting tools and adjustable mounts therefor, for use with a vehicle pneumatic tire changing machine.

Vehicle pneumatic tire changing machines are well-known and, in general, they provide a supported table for holding a vehicle wheel in an accessible, generally horizontal position. Means are provided for holding the wheel on the table while a tire is mounted or dismounted on the wheel. Various types of tools have been proposed for the required manipulations of removing or replacing the tire on the vehicle wheel. In general, such tools have been used in a position offset from the wheel center, that is, they are not used in a plane passing through the axis of the wheel, but are on one side or the other. The tools, therefore, do not contact the wheel rim perpendicular to a tangent thereto, and full leverage of the tool cannot be utilized. In many tire changing machines no tire tool mount is provided, and in the few that provide a tool mount, it is held at a single height.

An improved tire changing machine is described in my copending application, Serial No. 429,566, dated May 13, 1954, for Tire Mount. In that application there is provided a table and a central post with a clamped-down cone for holding the wheel on the table. A constant-height tool mount or cradle is provided on the center post for holding a tire tool during the activities of mounting and dismounting a tire on the wheel. An offset cradle or tool mount is, also, provided for use in the manipulation of the mounting and dismounting.

According to the present invention, there is provided an improved tool mount and tire tool which may be used with a tire mounting and dismounting machine, such as described in my copending application, above mentioned, or may be used with various machines which have wheel holding tables utilizing the various means for holding the wheel on the table, e. g. rim clamps, and the like. The invention includes a novel tool cradle which is adjustable to various heights above the tire to accommodate the various sizes of tires which may be used on the machine, and which provides new uses, reducing the number of required tools for such operations, and reduces the labor in the mounting and dismounting of the tire on the wheel.

In general, the present invention comprises an adjustable height post having a top mounted tool cradle. The post is adapted to be positioned centerwise of the hub hole of a held wheel, and it is adjustable to provide the optimum height for the cradle above the tire for holding a tire tool in the mounting and dismounting of a tire on the wheel. The adjustable height makes it possible to perform substantially all manipulations on all common sizes of tires with the use of a single tool. The cradle, furthermore, permits a single tire tool to be used as a dismount tool, a tire spreader, and a mounting tool. The center post may be used on machines using a hub hole clamp-down assembly, as well as with other machines using other clamp-down or holding systems. The post is mounted centerwise of the tire in the hub opening so that the tire tool may be used in the position directly perpendicular to a tangent running through the point of contact at the circumference of the rim where the tire tool contacts the tire. This perpendicular tire tool position not only reduces the amount of work required in mounting and dismounting the tire, but also permits new and unexpected uses of the device. The cradle is arranged to hold the tire tool in a substantially horizontal position, and by hooking the tire tool under the top bead of the tire, the bottom bead remaining on the rim, and by clamping the tire tool in a horizontal position, the tire or casing is spread and held in the open position. The arrangement of the cradle and tire tool also permits the tire to be snapped off of the rim with a single downward movement of the tool, as where the tire tool is hooked under the bead of the top side of the tire and by pulling down on the tool against the cradle in a quick motion, the entire tire snaps off the rim.

Included among the objects and advantages of the present invention is an improved tool cradle and means for adjusting the cradle to an optimum height in relation to a held vehicle tire for mounting and dismounting a pneumatic tire from a vehicle wheel. A novel tool cradle is provided which permits a single tire tool to be used for the normal operations connected with the changing and repairing of vehicle pneumatic tires. A novel tool is, also, provided which is useful in the mounting and dismounting of a casing from a vehicle wheel, and, further, reduces the number of tools and machines required in such operations.

These and other objects and advantages mentioned will be readily apparent by referring to the following description and appended drawings in which:

Fig. 1 is a side elevation, in partial section, showing the device of the invention in various manipulative positions with a tire and a vehicle wheel;

Fig. 2 is a sectional side elevation of the device according to the invention;

Fig. 3 is a top plan view of a vehicle wheel clamp-down cone, showing the center post lock means;

Fig. 4 is a top plan view, in partial section, of a cradle tool according to the invention; and Fig. 5 is a side elevation of a tire tool for use with the tool cradle and mount according to the invention.

In the device illustrated, a table 2 mounted on a base or support 4 holds a vehicle wheel 6 in substantially horizontal position. A tire 8 is mounted in the rim of the wheel. The wheel 6 is held on the table in secured position by means of a clamp-down cone 10 connected to a tube 9 which is detachably secured in the support 4 of the table. The cone 10 fits in the hub hole 11 of the wheel 6 securely holding the wheel on the table. An adjustable cradle post 12 is telescoped in the cone 10, and a tool cradle, shown in general by numeral 14, is rotatably mounted on the top of the cradle post 12. A tire tool 16 is adapted to be used with the cradle in mounting and dismounting a tire on a rim of the wheel. The cradle is mounted substantially on the axis of rotation of the wheel so that a tool resting on the cradle will be perpendicular to the circumference of the rim at the point of contact between the tool and the rim. In this position the tool and cradle may be rotated, or the wheel may be rotated around the tool, for uniform access to all parts of the wheel.

The clamp-down cone 10 illustrated as the holding means for the center post comprises a cone base 18 and three angular lugs 19 spaced at 120° around the base 18. While a completely conical member could be utilized, the three lugs decrease the weight of the member and are adequate for holding the wheel securely on the table. A central hole 20 accommodates the center post 12 therein. The opening through the tube 9 is aligned with the hole 20. A series of annular notches 15 are evenly spaced along a substantial portion of the center post, illustrated in detail in Fig. 2. The notches have an upper straight horizontal portion 17 which is in effect an overhanging lip, and a lower beveled surface 21 extending from the bottom of the notch 15 to the periphery of the tube. A spring-loaded latch 22 is reciprocably mounted on the top of the clamp-down cone, and a spring 23 is arranged to force the latch inwardly toward the center post for holding the same at a predetermined height. The end of the latch 24 has a slight bevel on the bottom surface of its notch engaging end so that the center post 12 may be pulled upwardly without releasing the latch. The surface 17, however, rests on the top of the latch 22 preventing downward movement and holding the center post in the desired position. The center post may be dropped only by releasing the latch from a notch. A square-cut annular groove 25 is provided as the last notch of the series on the center post so that the center post will stop when the notch 25 contacts the end of the latch 24. Since the notch 25 does not have a beveled lower surface, the latch 24 will not be pushed outwardly and the notch 25 acts as an effective stop. The latch 22 is held on the clamp-down cone by means of a U-clamp 26 secured by means of screws 27 to the clamp-down cone.

The cradle 14 comprises a lower annular portion 28 which seats on the top of the center post 12, and a cradle retainer ring 29 secures the cradle to the top of the center post permitting the cradle to rotate. The cradle 14 has two upwardly extending walls 30 and 31, a front tool rest 32, and a rear tool rest 33. The tool rests 32 and 33 both form the floor of the cradle. A thumb screw 34 is placed in the wall 31 near the laterally extended end of the cradle. The front tool rest 32 is in a position spaced from but in the proximity of the periphery of the center post, while the rear tool rest 33 extends a substantial distance outwardly away from the center post. An opening 35, which communicates with the interior of the tubular center post 12, substantially separates the front rest 32 and the rear rest 33. A small bore 36 is provided in the side wall 30 adjacent the opening 35.

A tire stop 37, which is a small metal rod, is secured to a tire stop cable 38 which extends through the small bore 36, through the bore 35, into the interior of the center post 12. A tire stop spring 39 in the center post 12, is attached by means of an attaching loop 40 to the cable 38. The spring provides means for returning the tire stop 37 after it is released from its tire holding position, as will be explained hereinafter. An end 41 of the tire stop 37 is bent up from the plane of the elongated wire 37 to prevent the tire stop from entering the small bore 36.

The tire tool, illustrated in Fig. 5, comprises a square, hollow handle portion 42, an S-shaped, hooked end 43 secured at one end of the handle, and a flat, pry end 44, having a small boss 45 adjacent the end thereof, secured to the other end of the handle 42. The squared handle 42 is arranged to seat in the cradle 14 and its square contour prevents it from rotating during use so that the tool will remain in correct position at all times during use.

In using the tire tool and tire mount of the present invention, a vehicle wheel 6 is placed on a change table 2 and is held securely thereon by means of a clamp-down cone 10. The adjustable center post 12 is placed in position in the clamp-down cone, with the cradle 14 secured on the top of the post. The adjustable center post is placed at the correct height to permit the tire tool 16 to be utilized in removing the tire 8 from the wheel 6. For removing the tire from the wheel, the pry end 44 is forced under the upper bead of the tire, as illustrated by the dashed lines, numeral 1 of Fig. 1, so that the bead rests over the boss 45. The pry end of the tire tool is placed under the bead, of course, after the bead has been broken loose from the rim by other means, well-known in the art. The tire tool is placed against the front rest 32 and by pulling down sharply on the tool 16, the entire tire may be snapped off the rim, including the front and the back bead. If it is desired merely to take the upper bead off the rim, the tool 16 is pulled down sufficiently to pull the bead off the rim at the point of contact, and the tool is then rotated around the rim to pull up the bead from the rest of the rim. For this use, the tire stop rod 37 is placed in between the rim and the tire along side the tool, the spring 39 holding the tire stop cable 38 which permits the tire stop to be pulled from its resting position against the bore 36 to the point where it can be inserted between the tire bead and the rim. The tire stop 37 prevents the bead from going back under the rim as the tool is roated beyond the point where it has first been pulled up. The tool is rotated around the rim and the bead is pulled over the rim. As soon as all of the bead is free from the rim, the tire stop is released and the spring pulls it back to its position against the bore 36. The spring provides in effect an automatic return for the tire stop. In pulling the bead off the rim, it is generally desirable to soap or lubricate the bead in the direction in which the tool 16 is to be rotated so that the bead may be easily pulled off the rim. The tire stop is very effective to prevent the bead from going back under the rim even with such lubrication.

In many instances it is desired to take the top bead off, remove the tube, and inspect the inside of the casing for the cause of the trouble. It may, also, be desired to investigate and repair the interior of the casing where tubeless tires are used. After the top bead of the casing has been removed from the wheel rim, the tool and mount may be utilized as a tire spreader, as illustrated by the dashed lines II of Fig. 1. In this case the tire tool is pulled down to where it rests on the front tool rest 32 and on the rear tool rest 33, holding the casing open as indicated. The thumb screw 34 is then screwed inwardly so that the tool 16 is securely held in a horizontal position holding the casing open. The tool and mount may now be rotated, progressively pulling the casing open completely around its periphery so that the entire internal surface of the casing may be inspected.

In replacing a tire on a wheel, the S-shaped hook is used for putting the bead back under the rim of the tire. One side of the hook is placed over the rim, the bead of the tire resting against the opposite side of the other end of the hook. The tool is then rotated around the rim, forcing the bead under the rim. In either operation of putting the bead under the rim or taking the bead out from under the rim, the square handle held in the cradle prevents the tool from turning and losing its grip on the bead of the tire.

The cradle and the tool are essentially the only tools required in the mounting and dismounting of the tire on a vehicle wheel. Once the bead has been broken loose from the rim, the tire is easily removed, opened for inspection or replaced on the rim of the wheel without further implements. The tire stop with its automatic retrieve aids in removing the tire from the rim. The adjustable center post 12 places the cradle at the correct height for using the tool so that maximum leverage can be obtained at the right angle for the manipulations required in the tire changing procedures. The latch and groove arrangement for holding the center post at the correct height is a positive and simple latch. It prevents the post from being forced down under the great pressure which is applied on the post in pulling the tire tool down on it during the removal operations for a tire from a wheel. Other holding arrangements may, obviously, be utilized which will adequately hold the center post. For convenience, however, the latch should permit the post to be readily moved upwardly without releasing the holding mechanism. The cradle may be utilized with other types of tire tools and its construction and adjustable height will provide an added advantage giving wider use for the tool. The square handle tool provides still other advantages, since it will not turn and lose its grip on the tire or the rim during use.

While the invention has been described by reference to specific embodiments, there is no intent to limit the scope and spirit of the invention to the precise details so described, except insofar as set forth in the following claims.

I claim:

1. In a tire mounting apparatus having a substantially horizontal vehicle wheel holding table and means for holding a removable tire holding center post, the improvement which comprises a tubular member arranged for telescoping with said table, a wheel clamp cone mounted on the upper end of said tubular member for engaging and holding a wheel positioned on said table, a cradle post arranged for telescoping engagement with said tubular member, means cooperative between said tubular member and said cradle post for holding said cradle post at a predetermined height, and an open tool cradle mounted on the upper end of said cradle post.

2. A tool cradle for use on a tire mounting apparatus comprising a body arranged to be rotatably mounted on top of a centrally alined post of said apparatus above a held tire, a horizontal tool resting wall extending across said body and above the centrally aligned post, the front portion of said wall being spaced from and in proximity to said post, the rear portion extending a substantial distance from said post and forming a horizontal tool rest, a pair of vertical walls extending upwardly from said bottom wall forming a tool holding slot, and a thumb screw mounted in one of said vertical walls above the rear portion of said horizontal wall for clamping a tool therein in horizontal position.

3. In a tire mounting apparatus having a tool cradle mounted on a centrally alined, vertically disposed post, a tire stop comprising an elongated member mounted adjacent the cradle and manually extendable to and arranged to be positioned between a tire bead and wheel rim so as to prevent return of the bead under said rim, and means for retrieving said stop on its release from between said bead and rim.

4. A tire stop according to claim 3 in which the elongated member is mounted on a flexible cable extending through a guide in the cradle and telescoped in the post.

5. A tire stop according to claim 4 in which the retrieving means is a spring mounted internally of said post.

References Cited in the file of this patent

UNITED STATES PATENTS

| | | |
|---|---|---|
| 1,098,488 | Dyar | June 2, 1914 |
| 1,341,727 | Weaver | June 1, 1920 |
| 2,471,642 | Moltz | May 31, 1949 |
| 2,485,202 | Kelly | Oct. 18, 1949 |
| 2,505,172 | Coats | Apr. 20, 1950 |
| 2,547,976 | Rockwell | Apr. 10, 1951 |
| 2,556,024 | Bourdon et al. | June 5, 1951 |
| 2,569,789 | Weaver | Oct. 2, 1951 |
| 2,607,403 | Patterson | Aug. 19, 1952 |
| 2,693,228 | Rockwell | Nov. 2, 1954 |
| 2,708,954 | Schultz | May 24, 1955 |
| 2,712,350 | Henderson | July 5, 1955 |

FOREIGN PATENTS

| | | |
|---|---|---|
| 637,555 | Great Britain | Sept. 30, 1947 |

OTHER REFERENCES

Popular Science, page 94, May 1940.